United States Patent [19]
Fellows

[11] Patent Number: 5,316,526
[45] Date of Patent: May 31, 1994

[54] TRANSMISSION OF THE TOROIDAL-RACE ROLLING-TRACTION TYPE
[75] Inventor: Thomas G. Fellows, Barnet, England
[73] Assignee: Torotrak (Development) Limited, United Kingdom
[21] Appl. No.: 960,445
[22] PCT Filed: Jul. 12, 1991
[86] PCT No.: PCT/GB91/01155
    § 371 Date: Dec. 22, 1992
    § 102(e) Date: Dec. 22, 1992
[87] PCT Pub. No.: WO92/01175
    PCT Pub. Date: Jan. 23, 1992
[30] Foreign Application Priority Data
    Jul. 13, 1990 [GB] United Kingdom ............... 9015438
[51] Int. Cl.5 ............................................... F16H 15/08
[52] U.S. Cl. .................................... 476/10; 476/40
[58] Field of Search ........................ 476/10, 40, 42
[56] References Cited
U.S. PATENT DOCUMENTS

| | | | |
|---|---|---|---|
| 2,076,560 | 4/1937 | Hayes | 476/10 X |
| 3,570,317 | 3/1971 | Kraus | 476/10 |
| 3,828,618 | 8/1974 | Sharpe et al. | 476/10 X |
| 5,048,359 | 9/1991 | Nakano | 476/10 |
| 5,067,360 | 11/1991 | Nakano | 476/10 |

FOREIGN PATENT DOCUMENTS

| | | |
|---|---|---|
| 0133330 | 12/1984 | European Pat. Off. . |
| 0078125 | 7/1985 | European Pat. Off. . |
| 4-29659 | 1/1992 | Japan ................................ 476/10 |
| 90/02277 | 3/1990 | PCT Int'l Appl. . |
| 90/05860 | 5/1990 | PCT Int'l Appl. . |
| 1134202 | 11/1968 | United Kingdom . |
| 1395319 | 5/1975 | United Kingdom . |
| 1600972 | 10/1981 | United Kingdom . |
| 2107009 | 4/1983 | United Kingdom . |

Primary Examiner—Leslie A. Braun
Assistant Examiner—David W. Laub
Attorney, Agent, or Firm—Davis, Bujold & Streck

[57] ABSTRACT

A ratio-varying component for a transmission of the toroidal-race rolling-traction type, in which each of the rollers (1) transmitting torque between an input disc (51, FIG. 3) and a corresponding output disc (40) is positioned hydraulically by means of an attached hydraulic piston (5) and cylinder (6) combination, in which all the cylinders lie to the same side of a common plane (43a) including the axis (43) of the discs. The cylinders may be supported on a common block-like structure (41), in which hydraulic conduits (31a, 32a, 37a, 44) may be contained.

9 Claims, 4 Drawing Sheets

TRANSMISSION OF THE TOROIDAL-RACE ROLLING-TRACTION TYPE

BACKGROUND OF THE INVENTION

This invention relates to transmissions of the toroidal-race rolling-traction type. It relates in particular to ratio-varying components, or "variators", for such transmissions, the variators being of the kind in which each of a set of rollers transmitting traction between an input disc and an output disc is connected to hydraulic mechanism by which it is positioned, the roller position being a key factor in determining the transmitted ratio.

DESCRIPTION OF THE PRIOR ART

Variators of this type are well known art, and patent specifications GB-A-1395319, GB-B-2107009, EP-B-0078125 and EP-B-0133330 are some of many in which such a roller positioning system is illustrated and described. Each of those four specifications shows a set of three rollers transmitting traction between a rotatable input disc and a coaxial and control-rotating output disc, each roller being spaced from the others by 120° of arc around the common axis of the discs. In each of the four specifications, the ratio transmitted from the input to the output disc by each roller is caused to vary by changing the position of that roller in a direction substantially tangential relative to the centre circle of the common torus presented by the input and output disc races. In each of the four quoted specifications, the mechanism for imparting that tangential movement to at least some of the rollers comprises pistons formed at opposite ends of the roller carriage—that is to say, the structure carrying the bearings on which the roller rotates—and moveable within hydraulic cylinders. Such a mechanism clearly requires many parts, because each of the two cylinders associated with each piston requires robust mechanism to maintain its position fixed, regardless of movement of the piston within it and of variations in the reaction between it and the piston. Furthermore each cylinder has to be connected to input and output hydraulic leads. Those leads, and their connections to the cylinders, must be substantial in order to withstand the fluid pressures to which they will be subjected, and the symmetrical disposition of the cylinders around the transmission axis means that the leads also will be disposed all around the circumference of the transmission, for instance cast within the transmission casing, or even possibly exposed. This creates a number of problems. For instance the cost of forming complex passages within a cast casing, the difficulty of making the joints to such passages oil-tight at high pressures, the need to maximise the diameter of all passages so as to minimise resistance to flow, the protection from damage of those parts if any of the passages are exposed, and the blocking of access for the assembling of the rollers and carriages.

It has also been proposed, for instance in patent specification GB-A-1600972, and in more detail in our U.S. patent application Ser. No. 07/689,774 (published as PCT International Publication No. WO90/05860) to control the tangential position and ratio angle of each roller by means of only a single piston-and-cylinder assembly located at only one of the ends of the roller carriage. For a typical set of three rollers this will clearly halve the number of cylinders, and thus diminish the problems of damage protection and access already referred to, but there is no teaching in either of those specifications that the three operating cylinders should be disposed otherwise than at intervals of 120° of arc around the axis of the discs, just like the rollers themselves are. Substantial problems therefore remain.

SUMMARY OF THE INVENTION

The present invention is based on appreciating that if each roller is positioned by only a single hydraulic operating mechanism, as just described, it is possible to modify the disposition of the three mechanisms so that they all lie generally to one side only of the common axis of the discs, so potentially alleviating several of the problems already referred to. The invention applies particularly to variators, as shown in all the prior patent publications so far identified by number, in which the configuration of the toroidal races, formed on the input and output discs, is such that the radius from the disc axis to the point of contact between each race and roller can vary over a range including values both greater and less than that of the radius from the disc axis to the centre circle of the common torus. The invention is defined by the claims, contents of which are to be read as included within the disclosure of this specification.

BRIEF DESCRIPTION OF THE DRAWINGS

The invention will now be described, by way of example, with reference to the accompanying diagrammatic drawings, in which.

DESCRIPTION OF THE PREFERRED EMBODIMENTS

Figure 1A:
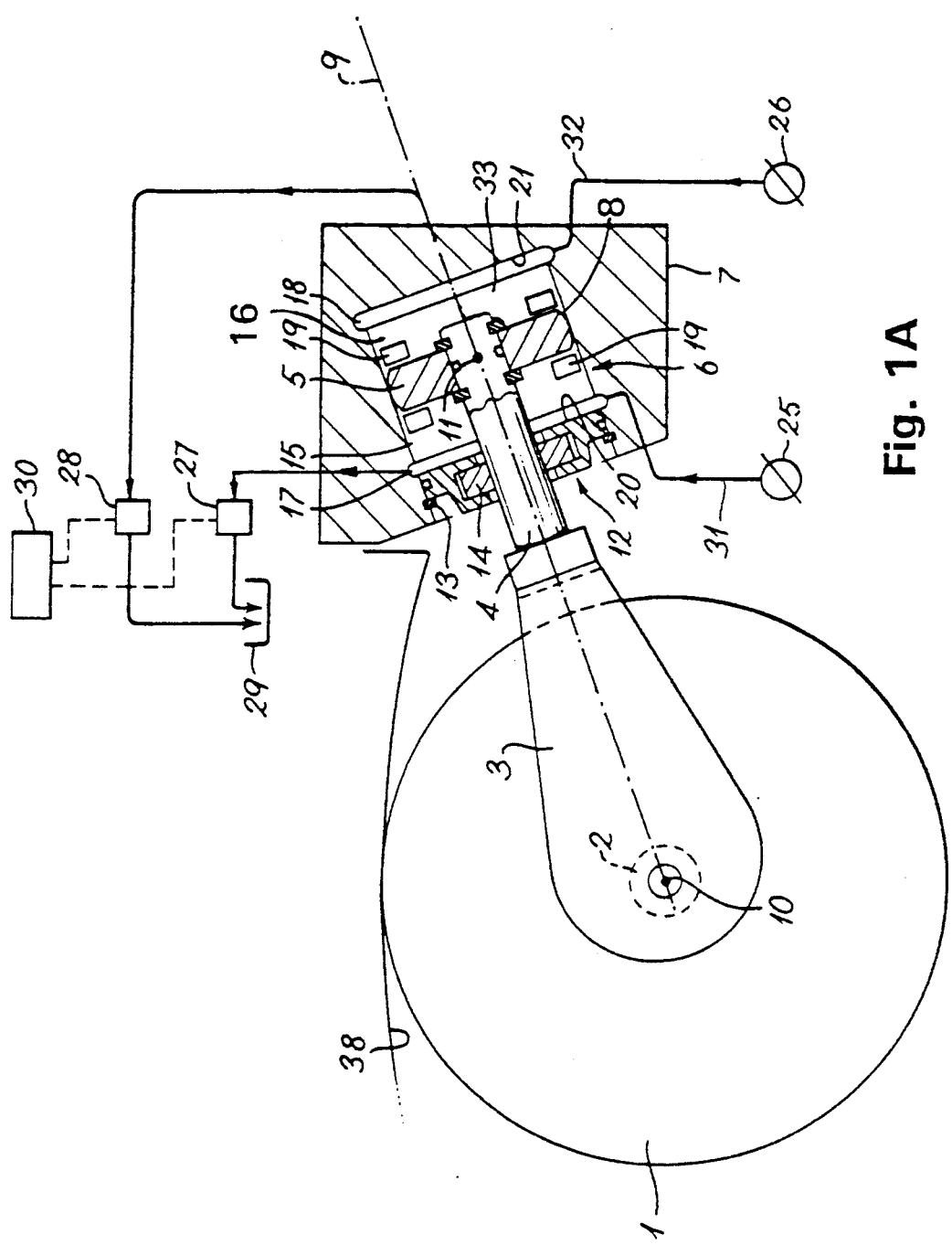
FIGS. 1A and 1B are respectively version 6' and 6", partly schematic and partly a section, an the line I—I in FIG. 2.
Figure 1B:
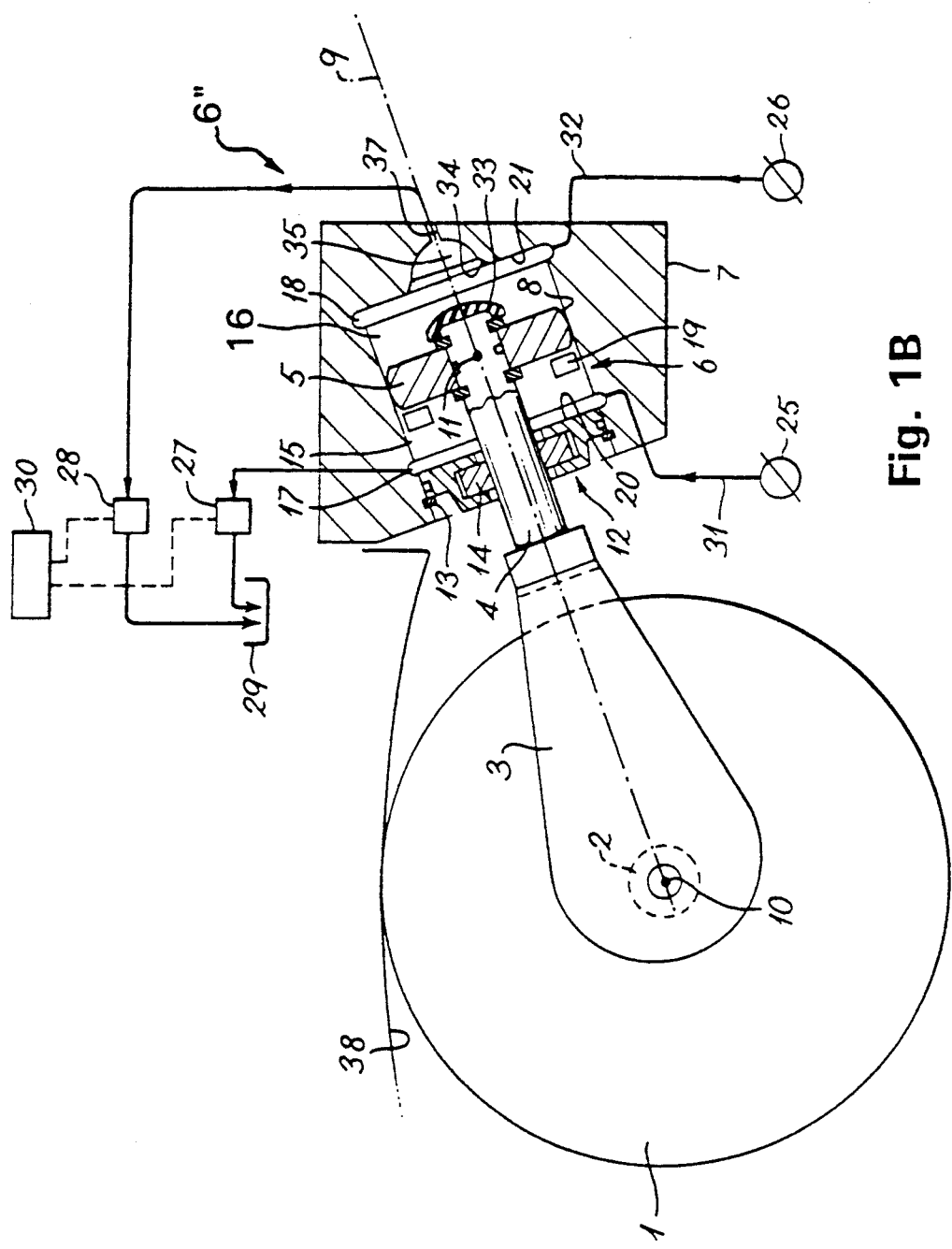

In FIG. 1 a roller 1, for use in the variator of a toroidal-race CVT, rotates in bearings 2 in a carriage 3, one end of which narrows and changes form into a rod 4, on the distal end of which is carried a double-acting piston 5 which moves within a roller-control cylinder 6, itself formed within a cylinder block 7. The rounded outer edge 8 of piston 5 allows the piston to tilt slightly within cylinder 6, as well as to move back and forth along the cylinder axis 9, so that the centre 10 of roller 1 is able not only to move up and down the same axis but also to depart from it, although the distance of the roller centre from the centre 11 of piston 5 is fixed. The front end of cylinder 6 is closed by a seal 12, held in place by a clip 13, and the central member 14 of the seal 12 is capable of limited radial movement relative to cylinder axis 9, so as to permit the roller centre the movement just described. Piston 5 divides cylinder 6 into two chambers 15 and 16. FIGS. 1A and 1B are that cylinder in two different versions, one (6') and the other (6") of the cylinder 6. In both of those versions, chamber 15 is formed with an annular groove 17 and chamber 16 with a similar groove 18. Reference 19 schematically indicates a suitable annular member, carried on the left-hand face of piston 5 in both versions (6' and 6") of cylinder 6, and on the right-hand face of the piston in version 6' only. Where so carried, member 19 prevents direct contact between the piston and the inner wall 20 of the seal 12 should the piston overshoot the intended leftward limit of its travel within the cylinder, and between the piston and the end wall 21 of the cylinder should the piston overshoot the intended rightward limit of its travel.

Figure 3:
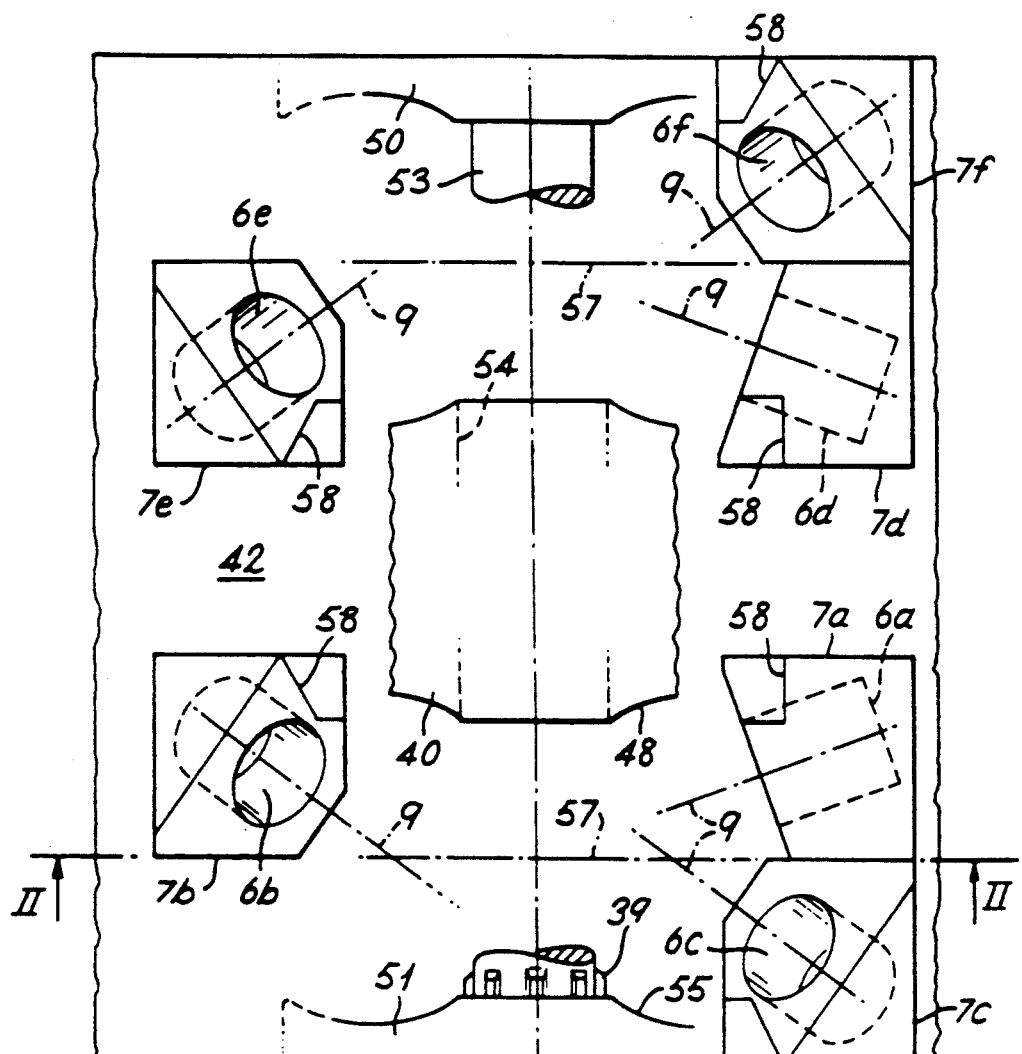
FIG. 3 is a simplified plan view of the six operating cylinders of a "double-ended" CVT of the toroidal-race rolling-traction type, and of the structure on which they are mounted.
Figure 4:
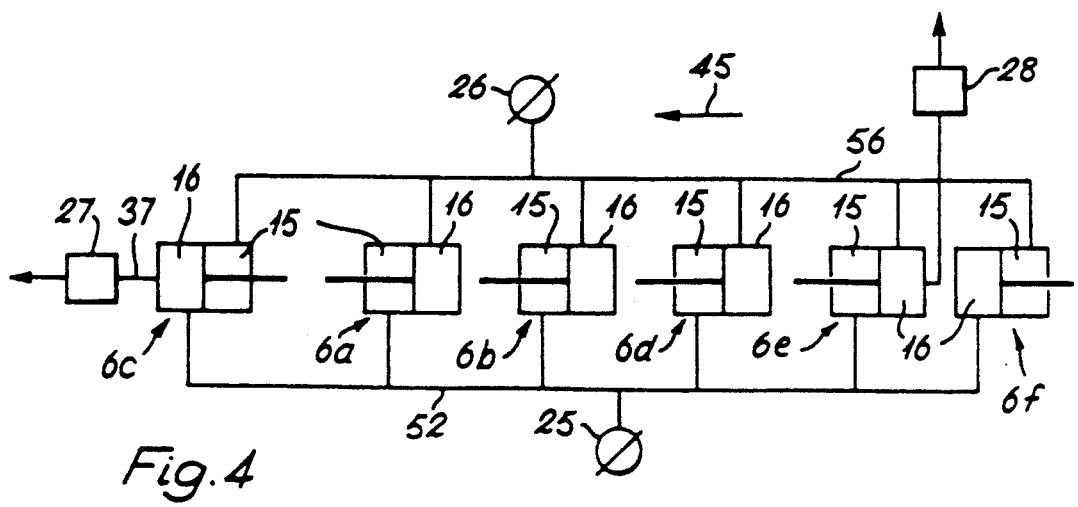
FIG. 4 shows schematically how versions 6' and 6" of the roller-control cylinder, as shown in FIG. 1, would be distributed amongst the six cylinders of FIG. 3.

A typical variator for such a CVT will comprise a set of three such rollers 1, each roller being controlled by a piston-and-cylinder combination 5/6, the three cylinders all being included within a common hydraulic control circuit. More typically still, and as shown in FIGS. 3 and 4, two such sets of rollers, making six rollers in all, are controlled by a common hydraulic circuit. That circuit, which is generally of the kind described in detail in U.S. Pat. No. 5,090,951, comprises two pumps 25 and 26, two pressure control valves 27 and 28 and a drain 29. The relative settings of control valves 27 and 28 are controlled, in a manner well known in the art, by a common electronic control device 30 which receives inputs representative of drive demand, engine speed, road speed and all other relevant parameters. By way of one of the chambers 15 or 16 of each of the cylinders 6, pump 25 is in series with control valve 27 and drain 29. By way of the other chamber 16 or 15 of each of the cylinders 6, the other pump 26 is in series with the other control valve 28 and so also with drain 29. In FIG. 1, by way of a single example only, chamber 15 is shown connected to pump 25 and also to control valve 27 and drain 29, and chamber 16 to pump 26 and also to control valve 28 and drain 29. However, the manner in which all the chambers 15 and 16 are combined in series between the pumps 25,26 and their respective control valves 27, 28, so as to ensure correct and uniform operation of all six rollers in a conventional "double-ended" system as shown in FIGS. 3 and 4, will be described with reference to those Figures. In each cylinder 6 constructed according to version 6', chamber 15 of the cylinder is connected to one of pumps (as shown, pump 25) by way of groove 17 and a conduit 31, and chamber 16 is connected to the other one of the two pumps by way of groove 18 and a conduit 32. However in version 6" (FIG. 1B) of the cylinder a boss 33, mounted on the end of rod 4, is shaped to match the chamfered edge 34 of a cavity 35 formed in the cylinder end wall 21. In version 6", as exemplified in FIG. 1B, chamber 16 is connected to the pump 26 by conduit 32 and, by way of a variety 35 and conduit 37, to the control valve 28, and thence to drain 29. When piston 5 lies in the normal limits of its travel within version 6", cavity 35 is unobstructed and fluid flow through the chamber 16 is determined by the delivery of the connected pump (25 or 26) and the setting of the respective control valve (27 or 28). Should piston exceed its normal stroke of rightwards movement, in version 6", however, the approach of boss 33 to edge 34 restricts the flow of fluid into conduit 37 and so raises the fluid pressure within chamber 16, thus setting up a "hydraulic stop" effect tending to oppose further motion of piston 5 to the right. If that fails to check the excessive travel of the piston, boss 33 meets edge 34 to create a physical stop.

FIG. 1 also shows, at 38, a fragment of the part-toroidal race on one of the discs (40, see FIGS. 2 and 3) between which the roller I will be transmitting traction.

Figure 2:
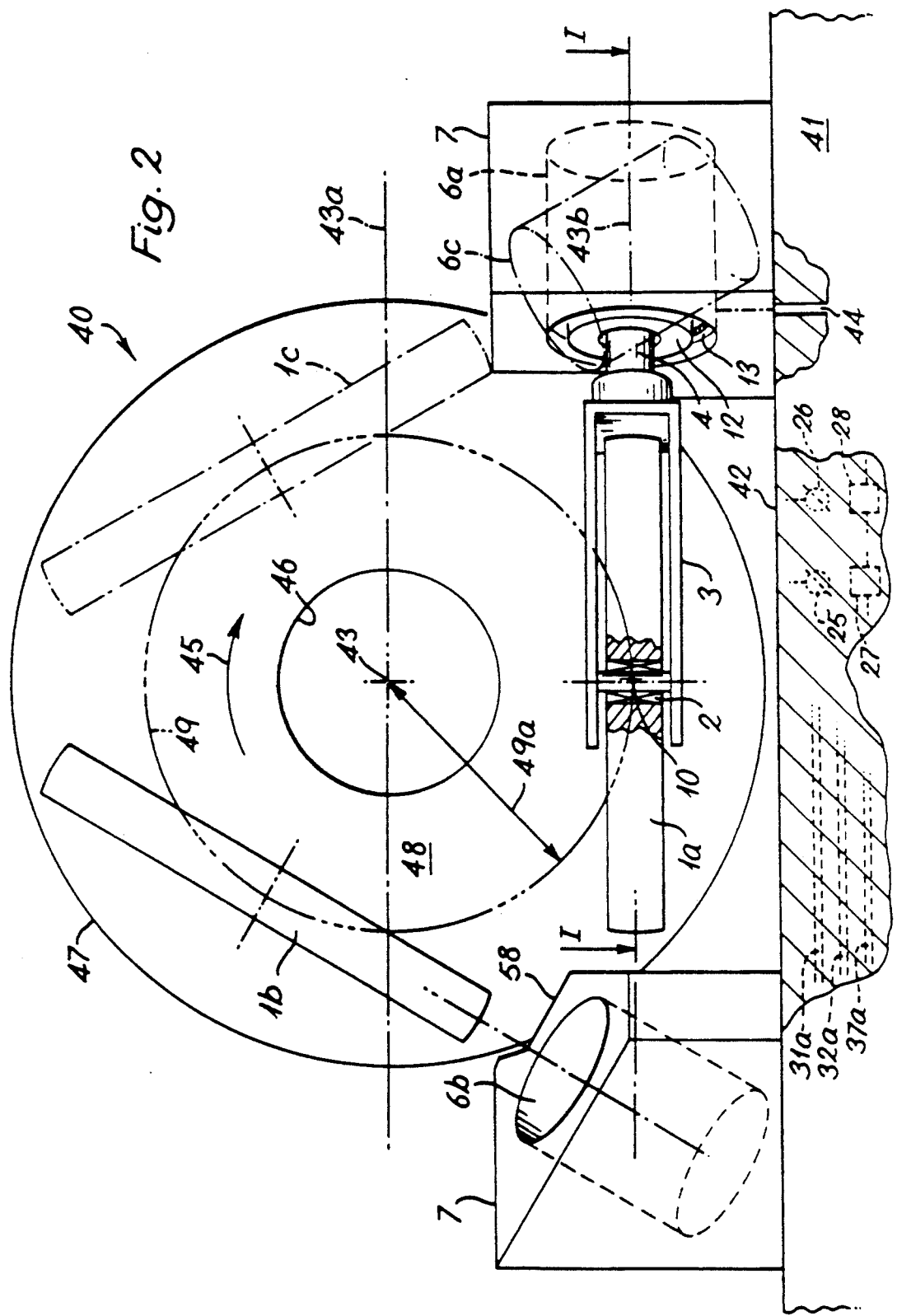
FIG. 2 is a simplified view of the variator as seen from the line II—II in FIG. 3.

The combination of roller, carriage and double-acting piston-and-cylinder operating mechanisms, just described with reference to FIG. 1, is closely similar to the double-acting mechanism described in U.S. patent application Ser. No. 07/689,774. According to the present invention, as shown in FIG. 2, the blocks 7 of each of the set of three rollers 1, transmitting traction between an input disc (not shown in that Figure) and an output disc 40, are all mounted on a single robust support structure 41, of generally rectangular shape and presenting a flat upper surface 42, so that the three blocks (identified in FIG. 3 as 7a, 7b and 7c) all lie to one side of a common plane 43a containing the common axis 43 of the discs, and are all intersected by another common plane (as shown, the transverse plane 43b of the section-line I—I) which is itself displaced from and substantially parallel to axis 43. As in FIG. 1, blocks 7 of FIG. 2 will again be connected to the pumps 25, 26 and control valves 27, 28 by conduits 31, 32 and 37, but now those conduits are largely contained within the structure 41, as indicated diagrammatically by way of example at 31a, 32a and 37a. If that structure is solid then the same conduits may be formed as drillings through that structure itself, one such drilling being shown by way of example at 44. The pumps 25, 26 and control valves 27 and 28 may also be housed within the structure, as outlined in FIG. 2, so further simplifying the hydraulic connections that have to be made.

Another preferred feature of the invention is shown best in FIG. 2. If arrow 45 indicates the direction of rotation of output disc 40, then it will be apparent that roller 1a follows its cylinder 6a relative to that direction, and that roller 1b similarly follows its cylinder 6b. With the remaining roller/cylinder combination 1c/6c, however, the order is reversed: the cylinder 6c follows its roller 1c relative to direction 45. This however presents no special problem for rollers with double-acting hydraulic operating mechanisms as shown in FIG. 1: all that is required is that chambers (corresponding to chambers) 15, 16 of FIGS. (1A and 1B), of cylinder 6c are connected to the same pumps as chambers (corresponding to chambers) 16, 15, FIGS. (1A and 1B), of cylinders 6a and 6b. In FIG. 2, lines 46 and 47 indicate the inner and outer radial extremities of the part-toroidal race 48, formed on output disc 40, on which the rollers 1a, b, c will be running, and line 49 the line of mid-radius, that is to say the radius (49a) equal to that of the centre circle of the common torus. This is the radius on which each of the rollers will be running when it is in the position of roller 1a, when the axis of rotation of the roller intersects the common axis 43 of the discs, and the roller is transmitting a ratio of unity so that the output disc 40 is rotating at the same speed as the corresponding input disc (51, FIG. 3) but in the reverse sense.

FIG. 3 shows the cylinders 6a, b and c of FIG. 2, and also the corresponding cylinders 6d, e and f for the second set of rollers of a "double-ended" toroidal-race CVT, and, in outline, parts of the input and output discs. As is customary in such double-ended units, input disc 50, at one axial end of the variator, is connected by input shaft 53 to input disc 51 at the other end, and output disc 40 lies between them and is formed with a cylindrical cavity 54 so that it is free to rotate around shaft 53. A splined connection 39 between shaft 53 and disc 51 allows the axial movement between shaft and disc to respond to end loading forces, as is well understood in the art. Rollers 1a, b and c (FIG. 2) transmit traction between race 55 on disc 51 and the race 48 on one face of output disc 40, and the three rollers (not shown, but to be referred to as 1d, 1e and 1f) of the other set (controlled by cylinders 6d, e and f) transmit traction between input disc 50 and the race on the opposite face of output disc 40. The efficient operation of such a double-ended toroidal-race CVT requires three particular objectives, among others, to be attained. Firstly, of course, each of the rollers 1a to 1f must transmit the same ratio between its respective input and output discs, which requires that the associated piston 5 must be subjected to the same net hydraulic force by the volumes of fluid within the chambers 15, 16 of its associated cylinder 6. Secondly, just as the connections between chambers 15, 16 and pumps 25, 26 in FIG. 2 were reversed for cylinder 6c, compared with cylinders 6a and 6b, so one of cylinders 6d, 6e and 6f must be similarly reversed relative to the other two. Thirdly, the complete hydraulic circuit will require four cylinders of version 6', and two of version 6", the latter two cylinders being reversed relative to each other so that a first of them generates a hydraulic end stop effect if the rollers tend to overshoot one extreme of their ratio range, and the second generates a like effect at the other extreme. Such an arrangement is shown in FIG. 4. As in FIG. 2, one of the cylinders (6c) of the first set of three rollers is reversed in direction relative to the other two cylinders 6a and 6b. Similarly, for the second set of rollers, cylinder 6f is reversed in direction relative to 6d and 6e. Thus cylinders 6a, 6b, 6d and 6e all face in the same direction (relative to the rotation 45 of output disc 40) and cylinders 6c and 6f face in the opposite direction. A common manifold 52, connected to the delivery of pump 25, is therefore connected to chambers 15 of cylinders 6a, b, d and e and to chambers 16 of cylinders 6c and f, thus ensuring equal pressure in all six of those chambers. Similarly a manifold 56, connected to the delivery of pump 26, is connected to chambers 16 of cylinders 6a, b, d and e and to chambers 15 of cylinders 6c and f. To complete the two hydraulic circuits of pumps 25 and 26 it is only necessary for two of the six cylinders to be of version 6", the remaining four being of the simpler version 6'. In order to generate a hydraulic end stop effect when the rollers are in danger of exceeding either of the two extremes of their normal ratio range, the two cylinders of version 6" must be reversed in direction. In FIG. 4 the two such cylinders are 6c and 6e. Chamber 16 of cylinder 6c completes the circuit between pump 25 and its associated control valve 27, whereas chamber 16 of cylinder 6e completes the circuit between pump 26 and the associated control valve 28. If the pistons tend to exceed the left-hand extremity of their normal stroke, the restriction of flow into conduit 37 from chamber 16 of cylinder 6c will generate a hydraulic end stop effect and so raise pressure in manifold 52, and if the pistons are in danger of exceeding the right-hand extremity of their stoke the end stop effect will be generated in chamber 16 of cylinder 6e, so raising Pressure in manifold 56.

FIG. 3 shows best that the axes 9 of cylinders 6 are all angled relative to transverse planes (57) which include the centre circle of the common torus of the discs between which the rollers positioned by those cylinders are transmitting traction. The angle of inclination, known in the art as caster angle, will of course be the same for all six of the cylinders, any appearance to the contrary in FIG. 3 being due to perspective. The presence of the caster angle helps make it possible to mount the blocks 7 of cylinders 6a, 6c and 6d, 6f closely alongside one another, as shown in FIG. 3: if the angle were small, or zero, it will be apparent that the blocks of the cylinders would foul each other if it were attempted, as in FIG. 3, to mount the three blocks in a generally common plane on the surface 42 of structure 41. With small or zero caster angles, therefore, an alternative placement of these cylinders would have to be found to avoid them fouling each other. A notch 58 formed on a corner of each of the cylinder blocks 7, and shown in FIG. 2 and 3, allows clearance for the outer edges of discs 50, 51 and 40.

While a solid or hollow and generally rectangular construction for the structure 41 has been described, alternatives are possible within the scope of the invention. For instance, a more open-work framework comprising two parallel and connected beams, one beam supporting the blocks of cylinders 6a, 6c, 6d and 6f of FIG. 3 and the other the blocks of cylinders 6b and 6e. Such a construction would again have the effect of locating all six cylinders and their blocks to one side of the axis 43, rather than distributed symmetrically around it, and of offering the potential of some protection to the hydraulic lines by which the cylinders are supplied.

I claim:

1. A variator for a transmission of the toroidal-race rolling-traction type, said variator comprising a set of rollers (1) transmitting tractions between an input disc (51,) and an output disc (40), wherein each roller of the set of rollers (1) is positioned hydraulically by means of an attached double-acting piston working within a hydraulic cylinder (5, 6,), all the cylinders being disposed on the same side of a common plane (43a) including a common axis of rotation of the discs.

2. A variator according to claim 1 comprising a common structure (41, FIG. 2) supporting all the cylinders.

3. A variator according to claim 1 wherein all cylinders are intersected by a common plane (43b) lying substantially parallel to the transmission axis (43).

4. A variator according to claim 1 wherein the roller set consists of three rollers (1a, 1b and 1c) substantially equally spaced around the common axis of the discs, and the direction of a line extending from one of the pistons to the roller centre of an associated one of the rollers (1c) is reversed relative to the corresponding direction of corresponding lines of the two rollers of the set.

5. A variator according to claim 4 wherein the cylinders (6a, 6b and 6c) of the three rollers are all offset from a plane (57) including the centre circle of a common torus of the two discs, so as to impart "caster angle" to the rollers.

6. A variator according to claim 5 wherein two (6a and 6b) of the cylinders lie to one side of the said plane (57) including the centre circle of the common torus and the remaining cylinder (c) to the other side of that pane (57).

7. A variator according to claim 1 wherein the common structure has the general outline of a rectangular block, and contains, within that outline, hydraulic channels (44, 31a, 32a, 37a) by which the cylinders are supplied.

8. A variator for a transmission of the toroidal-race rolling-traction type, said variator comprising an input disc formed with a part-toroidal input race and an output disc formed with a complementary part-toroidal output race, said races conforming to the outline of a torus defining a torus centre circle and the input and output discs having a common axis of rotation, a set of rollers disposed to transmit traction between said input and said output races, and a hydraulic positioning mechanism connected to each roller of said set and operable to impart control movements to that roller circumferentially relative to said common axis of rotation, said hydraulic positioning mechanism comprising a hydraulic cylinder and a double-acting piston within said hydraulic cylinder and attached to said roller, wherein all said cylinders lie to the same side of a common plane including said common axis of rotation of said discs and in which all said pistons are offset from a plane including said centre circle of the common torus of said discs so as to impart coaster angle to said rollers.

9. A variator for a transmission of the toroidal-race rolling-traction type, said variator comprising an input disc presenting a part-toroidal input race and an output disc presenting a part-toroidal output race, said races conforming to the outline of a common torus defining a torus centre circle, a set of rollers, each roller of the set being in rolling contact with said input race and said output race, a line joining points of contract between each roller and said input and output races lying at right angles to both said races and a hydraulic positioning mechanism connected to each roller of said set and operable to impart control movements to that roller circumferentially relative to said common axis of rotation, each said hydraulic positioning mechanism comprising a hydraulic cylinder and a double-acting piston within said hydraulic cylinder connected by connection means to the associated roller, wherein all said cylinders lie to the same side of a common plane including said common axis of said discs and the connection means defines a straight line connecting the associated piston and roller and none of the said straight lines connected said pistons to said rollers intersect with each other.

* * * * *